US012320377B2

(12) United States Patent
Freis et al.

(10) Patent No.: US 12,320,377 B2
(45) Date of Patent: Jun. 3, 2025

(54) FLOW DRILL SCREW INSTALLATION METHOD TO REDUCE INSTALLATION TORQUE AND PERMIT INSTALLATION INTO THICK MATERIALS

(71) Applicant: Ford Global Technologies, LLC, Dearborn, MI (US)

(72) Inventors: Amanda Kay Freis, Ann Arbor, MI (US); Garret Sankey Huff, Ann Arbor, MI (US); Nicholas Dornik, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/365,660

(22) Filed: Aug. 4, 2023

(65) Prior Publication Data
US 2025/0043812 A1 Feb. 6, 2025

(51) Int. Cl.
*F16B 25/10* (2006.01)
*F16B 25/00* (2006.01)

(52) U.S. Cl.
CPC ........ *F16B 25/106* (2013.01); *F16B 25/0021* (2013.01)

(58) Field of Classification Search
CPC .... F16B 25/106; F16B 25/10; F16B 25/0021; F16B 12/16; F16B 5/08; F16D 25/00; F16D 25/001; B23K 20/12
See application file for complete search history.

(56) References Cited

U.S. PATENT DOCUMENTS

| | | | | |
|---|---|---|---|---|
| 6,021,938 A | * | 2/2000 | Bock | B23K 20/12 228/103 |
| 8,578,992 B2 | * | 11/2013 | Kawaura | B23K 20/12 156/64 |
| 8,857,040 B2 | | 10/2014 | Freis | |
| 9,901,974 B2 | | 2/2018 | Pfeiffer et al. | |
| 10,981,213 B2 | | 4/2021 | Stützer et al. | |
| 10,987,742 B2 | * | 4/2021 | Horiuchi | B23B 35/00 |
| 11,852,180 B2 | * | 12/2023 | Maiwald | F16B 19/12 |

(Continued)

OTHER PUBLICATIONS

Sprovieri, Flow-Drilling Screws Help Carmakers Shed Weight, Assembly, Feb. 1, 2016, BNP Media, 2023.
(Continued)

*Primary Examiner* — Lawrence Averick
(74) *Attorney, Agent, or Firm* — Burris Law, PLLC

(57) ABSTRACT

A method includes operating an automatic tool at a first setting to drive a flow drill screw (FDS) into a substrate. The first setting is configured to rotate the FDS at a first rotational speed and apply a first axial feed force. The first setting is configured to cause flow of the substrate to permit the FDS to penetrate the substrate. The method includes detecting a predetermined first trigger condition including at least one of a depth gradient and a depth and switching the tool from the first setting to a second setting in response to a predetermined second trigger condition including at least one of a predetermined axial feed distance after detecting the first trigger condition and a predetermined time delay after detecting the first trigger condition. The second setting is configured to rotate the FDS at a lower rotational speed and apply a lower axial feed force.

19 Claims, 5 Drawing Sheets

(56) References Cited

U.S. PATENT DOCUMENTS

| | | | |
|---|---|---|---|
| 2011/0056629 A1* | 3/2011 | Kawaura | B23K 20/12 |
| | | | 228/112.1 |
| 2016/0325488 A1* | 11/2016 | Tanaka | B29C 65/8215 |
| 2019/0193167 A1* | 6/2019 | Horiuchi | B25J 11/005 |
| 2020/0400183 A1* | 12/2020 | Maiwald | F16B 25/106 |
| 2022/0308232 A1* | 9/2022 | Sun | G06T 7/521 |
| 2022/0395893 A1 | 12/2022 | Ludsteck et al. | |

OTHER PUBLICATIONS

Ejot FDS, The flow drill screw for high strength sheet metal joints, Product Pages, Feb. 2010, 2 pgs.
Semblex, FDS—Flow Drill Screw for High-Strength Sheet Joints, Product Pages, 8 pgs.

\* cited by examiner

FLOW DRILL SCREW INSTALLATION METHOD TO REDUCE INSTALLATION TORQUE AND PERMIT INSTALLATION INTO THICK MATERIALS

FIELD

The present disclosure relates to a method of installing a flow drill screw.

BACKGROUND

The statements in this section merely provide background information related to the present disclosure and may not constitute prior art.

A flow drill screw (FDS) is a specific type of screw that is used to generate a screw joint between a plurality of substrates, one of which being a lower substrate, without the use of part preparation like tapping a thread or punching a hole in the lower substrate. The lower substrate is typically metal and the total number of substrates is typically two to four, though other numbers can be used. The upper substrate (s) may or may not have a preformed thru-hole.

A typical FDS has a distal end portion that lacks threads or cutting edges and is configured to penetrate the substrate by locally heating the substrate with heat generated by rotational friction and axial pressure on the FDS. As the FDS penetrates the substrate, it forms threads in the substrate.

In a typical FDS process, an automatic tool is controlled to rotate the FDS at a high revolutions per minute (RPM) rate while applying a high axial force toward the substrate. The typical FDS automatic tool does not directly control axial position. This high RPM, high force generates the friction that heats the substrate and is maintained until the automatic tool detects a trigger condition that corresponds to the beginning of penetration. Immediately upon detecting this trigger condition, the controller of the automatic tool signals the automatic tool to reduce the RPM and force. Thus, the automatic tool reduces the RPM and force before the thread forming portion of the FDS enters the substrate so that the thread forming and tightening of the FDS against the substrate can occur at a lower RPM and force. It is generally understood in the art that the RPM and force should be reduced as soon as penetration is achieved, but not before. It is generally accepted in the art that if the FDS has not fully penetrated prior to the step down in RPM and force, then there is a high chance that the FDS will ultimately not penetrate the lower substrate at all. This is due to the lower speed and force not generating sufficient heat to continue penetration. Additionally, it is generally believed by those in the art that it is important that the RPM and force are reduced before the thread forming portion enters the substrate so that both there is sufficient process control as process completion nears (e.g., drive down and final tightening) and to allow the substrate to cool slightly before the thread forming portion enters the substrate. Ultimately, it is generally understood that, upon the final tightening and torque application to the FDS, the lowest temperature substrate will generally yield the highest stripping torque performance, which will reduce the chance for stripped joints. It is also generally understood to be critical that the RPM and force are sufficiently low at the typical step down point of the process to have acceptable capability to stop the process upon reaching a target torque value, and not overshoot and strip the joint.

It is important that the torque applied to the FDS during the penetration portion of the installation process not rise above the rated torque value of the FDS. While the typical FDS process works well for some substrates, particularly for metal sheets less than 5 mm thick, it is generally understood that the torque needed increases with increased substrate thickness. Accordingly, it can be difficult to install a typical FDS in relatively thick materials, such as substrates having a thickness of 5 mm or greater, without applying unacceptable levels of torque, which could fracture the FDS during installation. Furthermore, reducing the installation torque requirements for a substrate less than 5 mm could be advantageous for some applications. Known methods for reducing the installation torque require additional materials, such as special lubricants. Other solutions available for thicker materials require the use of a specialty fastener that is designed to withstand higher torques, whether through material or geometric changes.

The teachings of the present disclosure address these and other issues with installing a FDS in a substrate and particularly in thicker substrates.

SUMMARY

This section provides a general summary of the disclosure and is not a comprehensive disclosure of its full scope or all of its features.

In one form, the present disclosure provides a method of operating an automatic tool to install a flow drill screw (FDS) into a substrate. The method includes engaging the FDS with the automatic tool. The method includes operating the automatic tool at a first setting to drive the FDS into the substrate by causing flow of the substrate to permit the FDS to penetrate the substrate. The first setting is configured to rotate the FDS at a first rotational speed and to apply a first axial feed force on the FDS. The first setting is configured to cause flow of the substrate to permit the FDS to penetrate the substrate. The method includes detecting a predetermined first trigger condition. The predetermined first trigger condition includes at least one of a depth gradient and a depth. The method includes switching the automatic tool from the first setting to a second setting in response to a predetermined second trigger condition. The predetermined second trigger condition includes at least one of a predetermined axial feed distance after detecting the predetermined first trigger condition and a predetermined time delay after detecting the predetermined first trigger condition. The second setting is configured to rotate the FDS at a second rotational speed and to apply a second axial feed force to the FDS. The second rotational speed is less than the first rotational speed and the second axial feed force is less than the first axial feed force.

In variations of the method of the above paragraph, which can be implemented individually or in any combination: the predetermined first trigger condition includes the depth gradient; the depth gradient is between 40 to 200 mm/s, inclusive; the predetermined first trigger condition includes the depth; a shank of the FDS includes a threaded portion, a thread forming portion adjacent the threaded portion, a cylindrical portion adjacent the thread forming portion, and a tip portion adjacent the cylindrical portion, the thread forming portion defining a partial-depth threadform that narrows in diameter with increased distance from the threaded portion, wherein the tip portion tapers from the cylindrical portion to an end of the shank, wherein the depth is a depth at which the cylindrical portion enters the substrate; the predetermined second trigger condition includes the predetermined axial feed distance after detecting the predetermined first trigger condition; the predetermined axial feed distance is 4 mm; a shank of the FDS includes a threaded portion, a thread forming portion adjacent the threaded portion, a cylindrical portion adjacent the thread forming portion, and a tip portion adjacent the cylindrical portion, the thread forming portion defining a partial-depth threadform that narrows in diameter with increased distance from the threaded portion, wherein the tip portion tapers from the cylindrical portion to an end of the shank, wherein the predetermined axial feed distance corresponds to an axial feed distance at which the thread forming portion is at least partially within the substrate; a shank of the FDS includes a threaded portion, a thread forming portion adjacent the threaded portion, a cylindrical portion adjacent the thread forming portion, and a tip portion adjacent the cylindrical portion, the thread forming portion defining a partial-depth threadform that narrows in diameter with increased distance from the threaded portion, wherein the tip portion tapers from the cylindrical portion to an end of the shank, wherein the predetermined axial feed distance corresponds to an axial feed distance at which the thread forming portion is at least partially within the substrate but the threaded portion is not yet within the substrate; the predetermined second trigger condition includes the predetermined time delay after detecting the predetermined first trigger condition; the predetermined time delay is 20 ms; the substrate has a thickness of 5 mm or greater; the method further includes positioning one or more additional substrates adjacent the substrate such that the FDS clamps the one or more additional substrates to the substrate after completion of the method; the first rotational speed is between 3,000 to 12,000 RPM, inclusive, and the first axial feed force is between 0.5 to 4 kN, inclusive, wherein the second rotational speed is between 500 to 4,000 RPM, inclusive, and the second axial feed force is between 0.25 to 1.25 kN, inclusive.

In another form, the present disclosure provides a method of operating an automatic tool to install a flow drill screw (FDS) into a substrate. The method includes engaging the FDS with the automatic tool. The method includes operating the automatic tool at a first setting to drive the FDS into the substrate by causing flow of the substrate to permit the FDS to penetrate the substrate. The first setting is configured to rotate the FDS at a first rotational speed and to apply a first axial feed force on the FDS. The method includes detecting a predetermined first trigger condition. The predetermined first trigger condition includes a depth gradient. The method includes switching the automatic tool from the first setting to a second setting in response to a predetermined second trigger condition. The predetermined second trigger condition includes at least one of a predetermined axial feed distance after detecting the predetermined first trigger condition and a predetermined time delay after detecting the predetermined first trigger condition. The second setting is configured to rotate the FDS at a second rotational speed and to apply a second axial feed force to the FDS. The second rotational speed is less than the first rotational speed and the second axial feed force is less than the first axial feed force.

In variations of the method of the above paragraph, which can be implemented individually or in any combination: the depth gradient is between 40 to 200 mm/s, inclusive; the predetermined second trigger condition includes the predetermined axial feed distance after detecting the predetermined first trigger condition; the predetermined axial feed distance is 4 mm; the first rotational speed is between 6,000 to 10,000 RPM, inclusive, and the first axial feed force is between 0.5 to 3 kN, inclusive, wherein the second rotational speed is between 500 to 2,500 RPM, inclusive, and the second axial feed force is between 0.25 to 1.25 KN, inclusive.

In still another form, the present disclosure provides a method of operating an automatic tool to install a flow drill screw (FDS) into a substrate. A shank of the FDS includes a threaded portion, a thread forming portion adjacent the threaded portion, a cylindrical portion adjacent the thread forming portion, and a tip portion adjacent the cylindrical portion. The thread forming portion defines a partial-depth threadform that narrows in diameter with increased distance from the threaded portion. The tip portion tapers from the cylindrical portion to an end of the shank. The method includes engaging the FDS with the automatic tool. The method includes operating the automatic tool at a first setting to drive the FDS into the substrate by causing flow of the substrate to permit the FDS to penetrate the substrate. The first setting is configured to rotate the FDS at a first rotational speed and to apply a first axial feed force on the FDS. The method includes detecting a predetermined first trigger condition. The predetermined first trigger condition includes a depth gradient of between 40 to 200 mm/s, inclusive. The method includes switching the automatic tool from the first setting to a second setting in response to the thread forming portion of the FDS at least partially being within the substrate. The second setting is configured to rotate the FDS at a second rotational speed and to apply a second axial feed force to the FDS. The second rotational speed is less than the first rotational speed and the second axial feed force is less than the first axial feed force.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
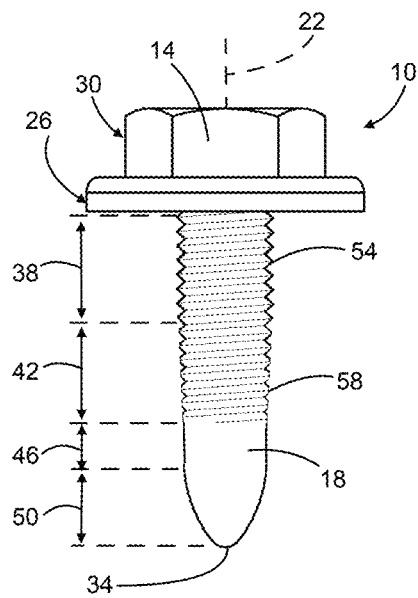
FIG. 1 is a side view of an example flow drill screw (FDS)

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a typical FDS 10 is shown and has a head 14 and a shank 18 disposed about a rotational axis 22. The head 14 includes a clamping portion 26 and a tool engagement portion 30. The clamping portion 26 extends radially outward from the shank 18. The tool engagement portion 30 is configured to be gripped by an automatic tool to rotate the FDS about its rotational axis 22. The shank 18 extends in an axial direction from the clamping portion 26 to a tip 34. Between the tip 34 and the clamping portion 26 is a threaded portion 38, a thread forming portion 42, a cylindrical portion 46 and an end portion 50. The tip 34 is typically rounded, relatively smooth, and relatively blunt, as shown, though some typical FDS's may have a more pointed tip. The end portion 50 includes the tip 34 and tapers radially outward to the cylindrical portion 46. The end portion 50 and the cylindrical portion 46 lack threads. In some forms, the cylindrical portion 46 has a constant diameter. In other forms, the cylindrical portion 46 has a diameter that increases more gradually than the end portion 50. The threaded portion 38 has at least one full threadform 54 disposed about the axis 22. The thread forming portion 42 is axially between the cylindrical portion 46 and the threaded portion 38 and has at least one partial threadform 58 that coincides with the at least one full threadform 54 but tapers radially inward from the full threadform 54 toward the cylindrical portion 46. In other words, the thread forming portion 42 has a partial-depth threadform that narrows in diameter (i.e., major diameter) with increased distance from the threaded portion 38. In some forms, not shown, a typical FDS may have a second cylindrical portion between the clamping portion 26 and the threaded portion 38.

Figure 2:
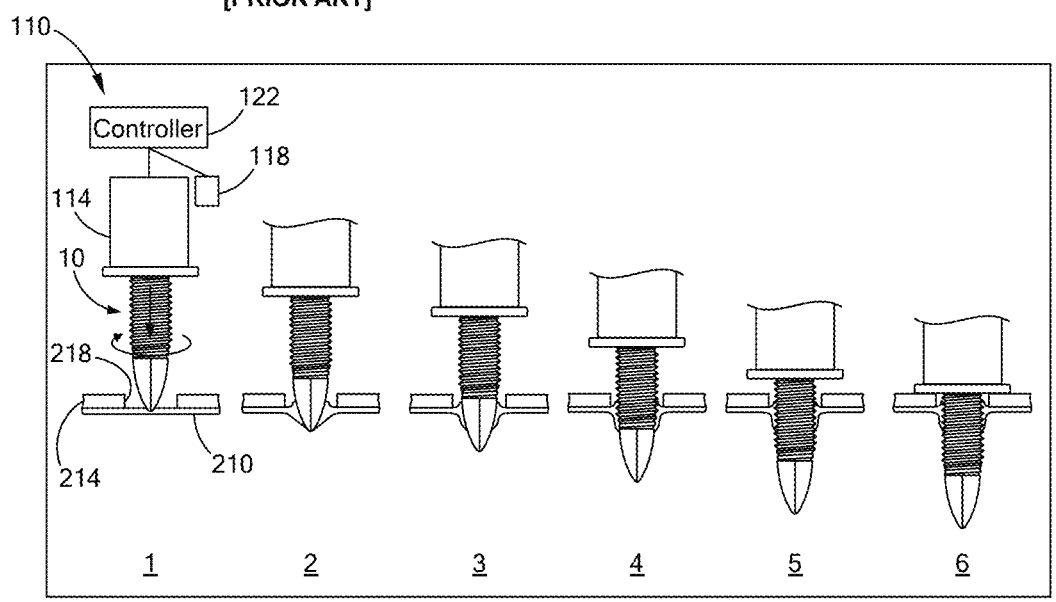
FIG. 2 is series of sequential phases of a FDS of FIG. 1 during an installation process according to the teachings of the present disclosure.

Referring to FIGS. 1 and 2, sequential phases or states (labelled 1-6) of the FDS 10 during an installation process by an installation tool 110 are shown. The tool 110 is an automatic tool that includes a driver 114, one or more sensors 118 (only shown in phase 1 for ease of illustration), and a controller 122 (only shown in phase 1 for ease of illustration). The driver 114 is configured to engage the tool engagement portion 30 of the FDS 10 to rotate the FDS 10 about its rotational axis 22 while applying an axial force toward a first substrate 210. The controller 122 is in communication with the driver 114 and the sensors 118 and configured to control operation of the driver 114 and receive input from the sensors 118.

The first substrate 210 can be any suitable material, formed using any suitable process. In one form, the first substrate 210 is aluminum or aluminum alloy. In another form, the first substrate 210 is magnesium or magnesium alloy. In yet another form, the first substrate 210 is steel or a steel alloy. In still another form, the first substrate 210 is a composite material. In some forms, the first substrate 210 can be a stamped sheet of material. In other forms, the first substrate 210 can be a casting. In still other forms, the first substrate 210 can be an extruded piece. In yet other forms, the first substrate may be forged.

While not specifically shown, the driver 114 includes a motor (e.g., electric motor, hydraulic motor, or pneumatic motor) configured to provide rotation and controlled by the controller 122. While not specifically shown, the driver 114 also includes an actuator, which may be actuated by any suitable power source (e.g., electric, hydraulic, or pneumatic power), to apply the axial force. The actuator is controlled by the controller 122. In one form, the actuator is a pneumatic actuator (e.g., pneumatic cylinder) to apply the axial force. In one form, the driver 114 may optionally be disposed a robotic arm (not shown) and the controller 122 can be configured to control movement of the robotic arm.

In the first phase, the FDS 10 is rotated while an axial force is applied on the FDS 10 in the axial direction toward the first substrate 210. In this first or initial phase, the first substrate 210 lacks any thru hole at the location where the FDS 10 is to be installed.

In the example provided, the first substrate 210 is a lower substrate and a second substrate 214 is an upper substrate disposed on top of the first substrate 210 and configured to be clamped to the first substrate 210 by the clamping portion 26 of the FDS 10. In the example provided, the second substrate 214 defines a pre-formed bore 218 that has a diameter greater than the shank 18 but less than the clamping portion 26 so that the clamping portion 26 can clamp the second substrate 214 against the first substrate 210. While only one second substrate 214 is illustrated, additional substrates can be used. For example, in some configurations, not specifically shown the FDS 10 may clamp one, two, three, four, or more additional substrates to the first substrate 210 in addition to the second substrate 214. These additional substrates may optionally have pre-formed thru-holes or the FDS may form the hole therethrough. In the example shown in FIG. 2, the FDS 10 penetrates entirely through the first substrate 210 in the final phase 6.

Figure 3:
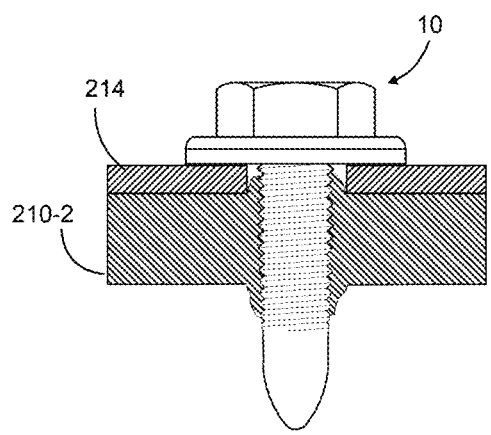
FIG. 3 is a partial cross-sectional view of a FDS installed in an example substrate according to the teachings of the present disclosure.

While the first substrate 210 is shown in FIG. 2 as being thinner than the second substrate 214, as shown in FIG. 3, the first substrate (indicated by reference numeral 210-2) may be thicker than the second substrate 214.

In another alternative configuration, not specifically shown, the first substrate 210 may be the top substrate and a second substrate may be the bottom substrate but without the pre-formed bore 218 (FIG. 2) of the second substrate 214. In this alternative configuration, the FDS 10 can drill through the first substrate 210 and through the second substrate to clamp the first substrate 210 to the second substrate.

In still another alternative configuration, not specifically shown, a second substrate can be entirely omitted and the FDS 10 can be connected only to the first substrate 210. In some such forms, the FDS 10 may include a connection feature (not shown, e.g., a hook, an eyelet, a magnet, surface for receiving adhesive, etc.) so that a mating feature on another component may be coupled to the FDS 10 after the FDS 10 is attached to the first substrate 210.

Returning to FIGS. 1 and 2, at the first phase 1, also referred to as the heating phase, the rotational speed and axial force of the tool 110 are configured to generate friction at the tip 34 to locally heat the substrate an amount sufficient to cause the substrate to melt or soften to a flowable state. In general, the tool 110 continues to rotate the FDS 10 and apply axial pressure thereto until the FDS 10 is fully tightened in the final (e.g., sixth) phase 6, also referred to as the tightening phase.

At phase 2, also referred to as the penetrating phase, the end portion 50 of the FDS 10 begins penetrating into the first substrate 210 but the cylindrical portion 46 has not entered into the first substrate 210. At phase 3, the cylindrical portion begins entering the first substrate 210 but the thread forming portion 42 has not entered into the first substrate 210. Phase 3 is also referred to as the hole forming phase as this is the phase at which the minor diameter of the bore is formed in the first substrate 210. It should be understood that, while phase 3 is shown with the tip 34 fully penetrated through the first substrate 210, the tip 34 may still be within the first substrate 210 depending on the thickness of the first substrate 210. At phase 4, the thread forming portion 42 begins penetrating into the first substrate 210 but the threaded portion 38 has not entered into the first substrate 210. Phase 4 is also referred to as the thread forming phase as the thread forming portion 42 develops the threads at this phase. At phase 5, the threaded portion 38 begins penetrating the first substrate 210. During phase 5, also referred to as the drive down phase, the threaded portion 38 threads into the threads formed by the thread forming portion 42 and progression of the FDS 10 proceeds axially into the first substrate 210 until the clamping portion 26 engages the second substrate 214 (or in the form where the second substrate is below the first substrate 210, the clamping portion 26 engages the first substrate 210) to begin the final phase 6. At phase 6, also referred to as the tightening phase or final tightening phase, the FDS 10 is tightened until fully tight.

In some forms, the sensors 118 can detect a predetermined end trigger condition and the controller 122 controls the driver 114 to tighten the FDS 10 until the predetermined end trigger condition. In one form, the sensors 118 can include a torque sensor and the end trigger condition may be a predetermined final torque value. The predetermined final torque value is less than a torsional strength rating of the FDS 10. In another form, sensors 118 can include a depth or position sensor and the predetermined end trigger condition can be a depth or position of the FDS 10.

Figure 4:
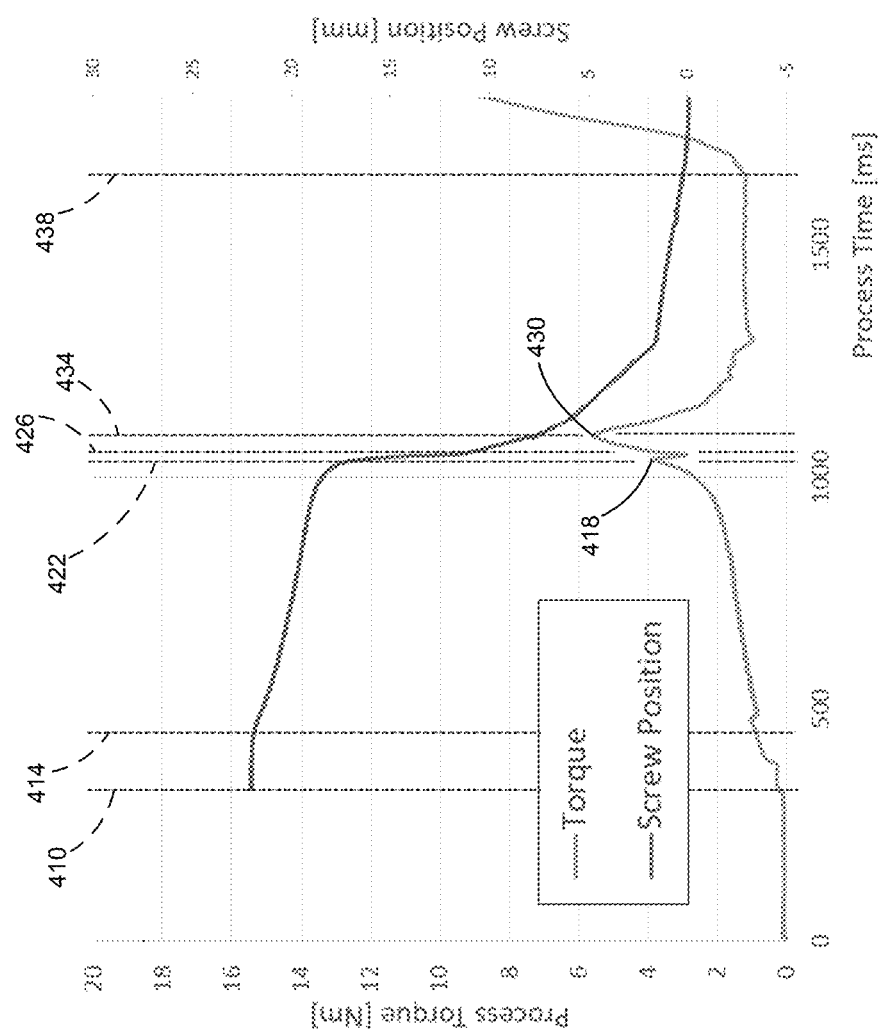
FIG. 4 is a graph illustrating torque and screw position for an installation process of a flow drill screw according to the teachings of the present disclosure.

Referring to FIG. 4, torque and screw position (i.e., depth) are illustrated over time during an installation process of a FDS 10. In this graph, the maximum screw position (i.e., at line 410) refers to the position at which the tip 34 of the FDS 10 initially contacts the first substrate 210 and the screw position of 0 mm (zero mm) refers to the final position wherein the clamping portion 26 clamps the second substrate 214 against the first substrate 210 (or in the form where the second substrate is below the first substrate 210, the clamping portion 26 engages the first substrate 210).

Referring to FIGS. 3 and 4, phase 1 (i.e., the heating phase) begins at line 410 and proceeds to line 414. During this phase, the torque rises but the axial position of the FDS 10 remains stationary as heat builds up.

Phase 2 (i.e., the penetrating phase) begins at line 414. During this phase, the torque continues to rise to a first peak 418 and the axial position of the FDS 10 progresses slowly downward (i.e., toward zero mm) as the tip 34 begins penetrating the first substrate 210. As shown, the axial position of the FDS 10 may begin to slowly accelerate downward while the tip 34 continues to penetrate the first substrate 210 due to the first substrate 210 continuing to soften due to the buildup of heat.

Phase 3 (i.e., the hole forming phase) begins at line 422. During this phase, the torque drops and the axial position of the FDS 10 accelerates quickly downward as the cylindrical portion 46 enters the first substrate 210.

Phase 4 (i.e., the thread forming phase) begins at line 426. During this phase, the torque rises quickly to a second peak 430 and the axial position of the FDS 10 continues downward, though at a slower rate than during phase 3, as the thread forming portion 42 enters the first substrate 210 and forms threads in the first substrate 210.

Phase 5 (i.e., the drive down phase) begins at line 434. During this phase, the torque decreases to a generally steady state as the axial position of the FDS 10 continues downward via mating action of the threaded portion 38 and the threads formed in the first substrate 210 by the thread forming portion 42 during phase 4.

Phase 6 (i.e., the final tightening phase) begins at line 438. During this phase, the torque rises steeply while the axial position of the FDS 10 remains substantially at zero mm. The torque rises until the end trigger condition is met and the controller 122 stops rotation of the driver 114.

Figure 5:
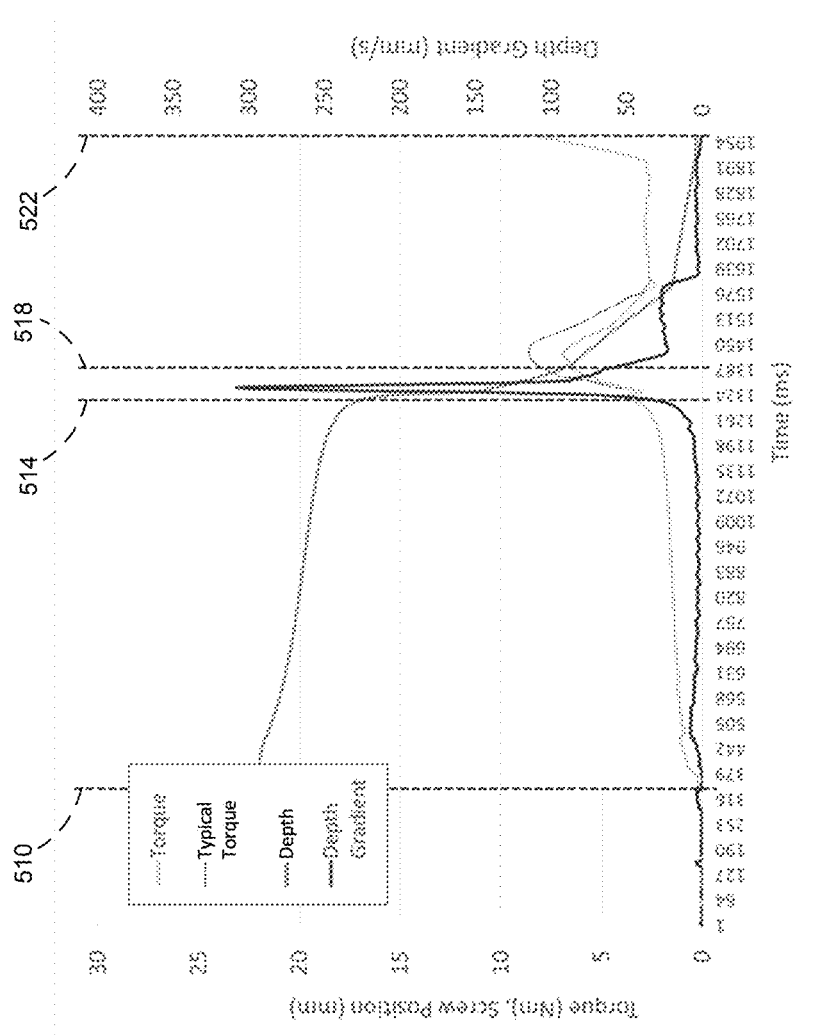
FIG. 5 is a graph illustrating torque, screw position, and depth gradient for an installation process of a flow drill screw according to the teachings of the present disclosure.

Referring to FIG. 5, a graph showing torque, axial position (i.e., depth) of the FDS 10, and a depth gradient (mm/s) of the FDS 10 during an installation process, is illustrated. Line 510 represents the controller 122 sending a signal to the driver 114 to start rotating the FDS 10 at a first RPM and to apply a first axial force on the FDS 10 toward the first substrate 210. Line 514 represents the sensor 118 detecting a first trigger condition. Line 518 represents a second trigger condition occurring. Line 522 represents an end trigger condition occurring. The dotted torque curve represents the torque values for a typical installation process, discussed in further detail below with reference to FIG. 6. The solid torque curve represents the torque values for the installation process of the present disclosure and as discussed in detail below with reference to FIG. 7.

Figure 6:
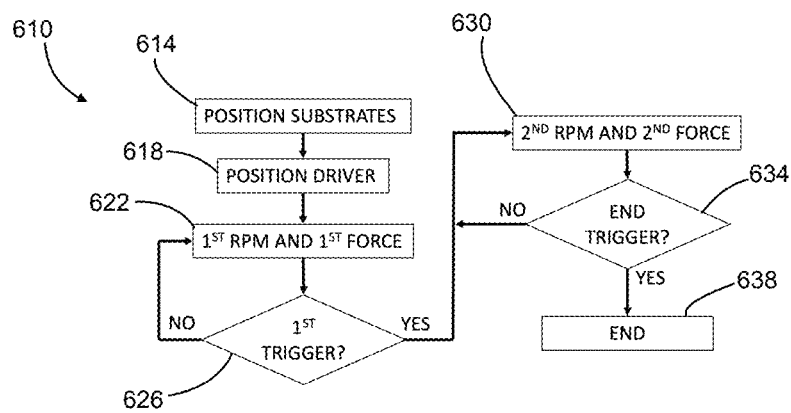
FIG. 6 is a flow chart of a typical installation process for a flow drill screw.

Referring to FIG. 6 a typical installation process or method 610 is illustrated. The typical installation method 610 includes step 614. At step 614, the substrate or substrates (e.g., the first substrate 210 and the second substrate 214) are positioned. The method 610 then proceeds to step 618.

At step 618, the controller 122 positions the driver 114 to be engaged with the FDS 10 and so that the tip 34 of the FDS 10 contacts the first substrate 210 at a predetermined location on the first substrate 210. The method 610 then proceeds to step 622.

The beginning of step 622 corresponds to line 510 (FIG. 5). At step 622, the controller 122 operates the automatic tool 110 at a first setting. For the first setting, the controller 122 controls the driver 114 to rotate at a first rotational speed (i.e., RPM) and to apply a first axial force on the FDS 10. In other words, the controller 122 can send signals to the driver 114 to cause the driver 114 to rotate the FDS 10 at the first rotational speed while pressing the FDS 10 against the first substrate 210 with a first axial feed force. The first rotational speed is also referred to herein as a high rotational speed and is in the range of 3,000 to 11,000 RPM, inclusive. In one form, the first rotational speed is more specifically in the range of 6,000 RPM to 11,000 RPM, inclusive. The first axial feed force is also referred to herein as a high axial feed force and is in the range of between 1 to 2 kilonewtons (kN), inclusive.

While minor fluctuations may occur, the control signals from the controller 122 for the first setting are configured to operate the driver at a constant rotational speed and axial feed rate during step 622.

While the driver 114 is applying the first rotational speed and the first axial feed force, the sensor(s) 118 detect a depth or position of the FDS 10. The controller 122 receives signals from the sensor(s) 118.

At step 626, the controller 122 determines, based on the signals from the sensor(s) 118, if a predetermined first trigger condition is met. The first trigger condition of the method 610 is a depth of the FDS 10 or a depth gradient of the FDS 10. For example, the sensor(s) 118 may detect a position of the FDS 10 or the depth gradient. The controller 122 may be configured to determine the depth gradient based on position measurement by the sensor(s) 118. The controller 122 continues operating the driver 114 at the first rotational speed and the first axial feed force until the first trigger condition is met. The detection of the first trigger condition is represented by line 514 (FIG. 5) and corresponds to the start of phase 3 at line 422 (FIG. 4). When the first trigger condition is met, the method 610 proceeds immediately and directly to step 630.

At step 630, the controller 122 operates the automatic tool 110 at a second setting. At the second setting, the controller 122 sends a signal to the driver 114 to immediately begin operating the driver 114 at a second rotational speed and a second axial feed force. The second rotational speed is also referred to herein as a low rotational speed and is in the range of 1,500 to 4,000 RPM, inclusive, but is less than the first rotational speed. The second axial feed force is also referred to herein as a low axial feed force and is in the range of 0.25 to 1.25 KN, inclusive, but is less than the first axial feed force.

While minor fluctuations may occur, the control signals from the controller 122 for the second setting are configured to operate the driver at a constant rotational speed and axial feed rate during step 630.

While the driver 114 is applying the second rotational speed and the second axial feed force, the sensor(s) 118 detect a depth or position of the FDS 10. The controller 122 receives signals from the sensor(s) 118.

At step 634, the controller 122 determines, based on signals from the sensor(s) 118 if a predetermined end trigger condition is met. The end trigger condition may be a final torque value. The controller 122 continues operating the driver 114 at the second rotational speed and the second axial force until the end trigger condition is met. The end trigger condition is represented by line 522 (FIG. 5). Once the end trigger condition is met, the controller 122 stops the rotation and axial force of the driver 114 to end the method, as indicated by step 638.

In other words, the typical installation method 610 for the FDS 10 involves driving the FDS 10 at a preset high rotational speed and a preset high axial feed force and then immediately switching to a preset low rotational speed and a preset low axial feed force upon detecting the first trigger condition and maintaining the lower rotational speed and axial feed force until the FDS 10 is fully tightened. As such, the controller 122 controls the driver 114 to be at the lower rotational speed and lower axial feed force before the thread forming portion 42 enters the first substrate 210.

Figure 7:
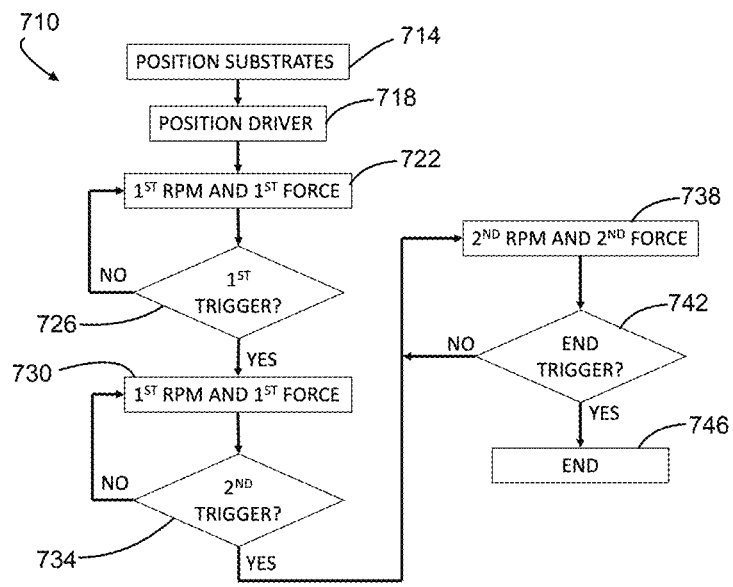
FIG. 7 is a flow chart of a method of installing a flow drill screw according to the teachings of the present disclosure.

Referring to FIG. 7, an installation process or method 710 according to the present disclosure is illustrated. The method 710 includes steps 714, 718, and 722. Steps 714, 718, and 722 may be identical to steps 614, 618, and 622, respectively. The method 710 then proceeds from step 722 to step 726.

At step 726, the controller 122 determines, based on the signals from the sensor(s) 118, if a predetermined first trigger condition is met. The first trigger condition of the method 710 can be a depth of the FDS 10 or a depth gradient of the FDS 10. For example, the sensor(s) 118 may detect a position of the FDS 10 or the depth gradient. The controller 122 may be configured to determine the depth gradient based on position measurement by the sensor(s) 118. The controller 122 continues operating the driver 114 at the first setting, i.e., the first rotational speed and the first axial feed force, until the first trigger condition is met. The detection of the first trigger condition is represented by line 514 (FIG. 5) and corresponds to the start of phase 3 at line 422 (FIG. 4).

In some forms, the first trigger condition is a depth gradient within the range of 40 to 200 mm/s, inclusive. In one form, the first trigger condition is a depth gradient within the range of 80 to 120 mm/s, inclusive.

When the controller 122 identifies that the first trigger condition is met, the controller 122 continues to operate the driver 114 at the first setting, i.e., the first rotational speed and the first axial feed force, as indicated by step 730.

At step 734, the controller 122 determines if a predetermined second trigger condition is met. The second trigger condition of the method 710 can include a predetermined axial feed distance after detecting the first trigger condition and/or a predetermined time delay after detecting the first trigger condition. For example, in one form, the sensor(s) 118 may detect a position of the FDS 10 or the depth gradient and the controller 122 can be configured to determine whether the FDS 10 has progressed axially the predetermined axial feed distance. In another form, the controller 122 may determine whether the predetermined time delay as passed since detecting the first trigger condition. The controller 122 continues operating the driver 114 at first setting, i.e., the first rotational speed and the first axial feed force, until the second trigger condition is met. The detection of the second trigger condition is represented by line 518 (FIG. 5). When the second trigger condition is met, the method 710 proceeds to step 738.

At step 738, the controller 122 sends a signal to the driver 114 to immediately begin operating the driver 114 at a second setting, i.e., a second rotational speed and a second axial feed force. The second rotational speed is also referred to herein as a low rotational speed and is in the range of 1,500 to 4,000 RPM, inclusive, but is less than the first rotational speed. The second axial feed force is also referred to herein as a low axial feed force and is in the range of 0.25 to 1.25 KN, inclusive, but is less than the first axial feed force.

While minor fluctuations may occur, the control signals from the controller 122 for the second setting may be configured to operate the driver at a constant rotational speed and axial feed rate during step 738.

In one form, the second trigger condition is a predetermined time delay and/or predetermined position that corresponds to the start of phase 4 at line 426 (FIG. 4). Due to inertia in the components of the driver 114 and the time delay for the signal from the controller 122 to reach the driver 114, the FDS 10 will continue at the first rotational speed and the first axial feed force while the thread forming portion 42 enters and begins to act on the first substrate 210. As such, the FDS 10 reaches the second rotational speed and second axial feed force while the thread forming portion 42 is already acting on the first substrate 210.

In another form, the second trigger condition is a predetermined time delay and/or predetermined position that corresponds to a position within phase 4, i.e., between lines 426 and 434 (FIG. 4). As such, controller 122 continues to operate the driver 114 to drive the FDS 10 at the first rotational speed and the first axial feed force while the thread forming portion 42 acts on the first substrate 210 and sends a signal to reduce the rotational speed and axial feed force only after the thread forming portion 42 has begun acting on the first substrate 210. In this form, the signal from the controller 122 to reduce the speed is sent before the threaded portion 38 enters the first substrate 210. The signal may be sent such that the FDS 10 reaches the second rotational speed and the second axial feed force before or after the threaded portion 38 enters the first substrate 210.

In still another form, the second trigger condition is a predetermined time delay and/or predetermined position that corresponds to a position at the end of or after phase 4, i.e., at or shortly after line 434 (FIG. 4). As such, controller 122 continues to operate the driver 114 to drive the FDS 10 at the first rotational speed and the first axial feed force while the thread forming portion 42 acts on the first substrate 210 and sends a signal to reduce the rotational speed and axial feed force at the point when or after the threaded portion 38 has entered the first substrate 210.

In some forms, the predetermined position of the second trigger condition can be 4 millimeters (mm) of axial movement toward the first substrate 210 after the first predetermined trigger condition is met. The axial position or time delay of the second trigger condition depends on the axial length of the cylindrical portion 46.

In some forms, the second trigger condition is a predetermined time delay of 20 milliseconds (ms).

At step 742, the controller 122 determines, based on signals from the sensor(s) 118 if a predetermined end trigger condition is met. The end trigger condition may be a final torque value. The controller 122 continues operating the driver 114 at the second rotational speed and the second axial force until the end trigger condition is met. The end trigger condition is represented by line 522 (FIG. 5). Once the end trigger condition is met, the controller 122 stops the rotation and axial force of the driver 114 to end the method, as indicated by step 746.

In other words, the installation method 710 for the FDS 10 involves maintaining the FDS 10 at a preset high rotational speed and a preset high axial feed force until after the thread forming portion 42 has begun acting on the first substrate 210 and then switching to a preset low rotational speed and a preset low axial feed force for drive down and final tightening thereafter. As such, the controller 122 detects when the cylindrical portion 46 enters the first substrate 210 and does not lower the speed and axial feed force until after the thread forming portion 42 enters the first substrate 210. As such, the temperature of the first substrate 210 does not lower until after the thread forming portion 42 has begun forming the threads in the first substrate 210.

Figure 8:
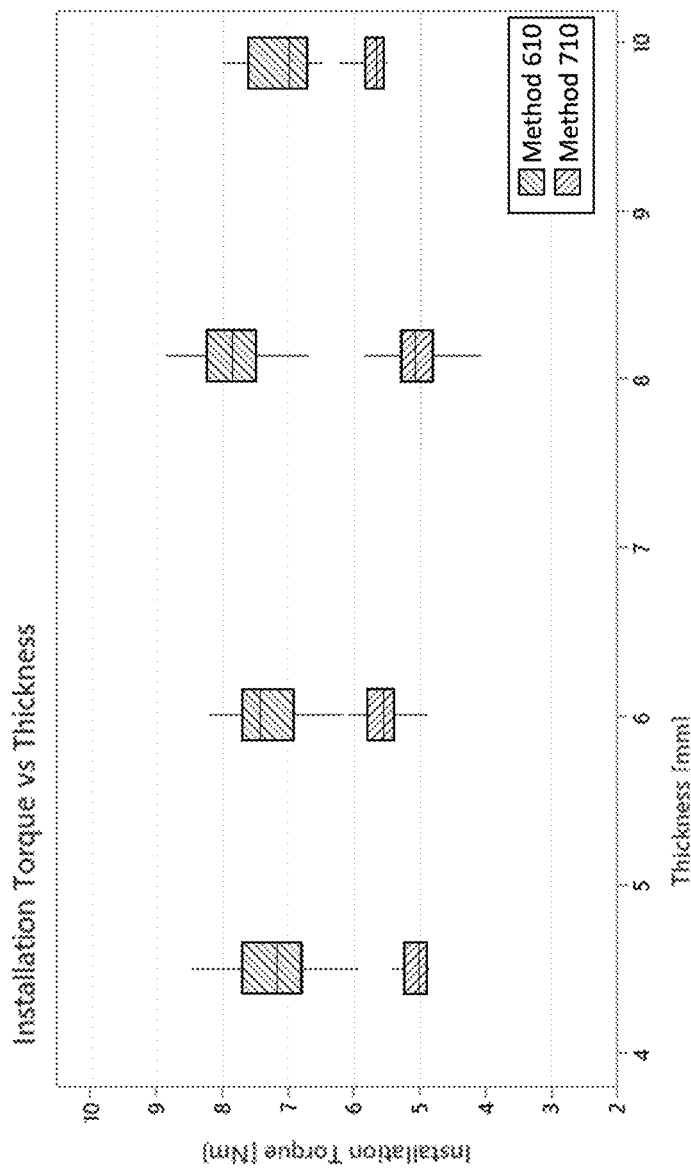
FIG. 8 is a chart illustrating installation torque of the process of FIG. 6 compared to installation torque for the method of FIG. 7.

Referring to FIG. 8, a graph showing the unexpected results of the method 710 compared to method 610 is illustrated. The X-axis is thickness in mm of the first substrate 210. The Y-axis is the torque needed to install the FDS 10. As can be seen, the installation torque for method 610 has been found to be significantly greater than that of method 710 for all thicknesses, including thicknesses not specifically represented on FIG. 8. Thus, the thickness of the first substrate 210 can be any thickness. In some forms, the thickness of the first substrate 210 is greater than or equal to 5 mm. In other forms, the thickness can be less than 5 mm.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating an automatic tool to install a flow drill screw (FDS) into a substrate, the method comprising:

engaging the FDS with the automatic tool;

operating the automatic tool at a first setting to drive the FDS into the substrate by causing flow of the substrate to permit the FDS to penetrate the substrate, the first setting being configured to rotate the FDS at a first rotational speed and to apply a first axial feed force on the FDS, the first setting being configured to cause flow of the substrate to permit the FDS to penetrate the substrate;

detecting a predetermined first trigger condition, the predetermined first trigger condition including at least one of a depth gradient and a depth;

detecting a predetermined second trigger condition using the one or more sensors, the predetermined second trigger condition detected in response to the predetermined first trigger condition being detected, the predetermined second trigger condition including at least one of a predetermined axial feed distance and a predetermined time delay; and switching the automatic tool from the first setting to a second setting in response to the predetermined second trigger condition being met, wherein the second setting is configured to rotate the FDS at a second rotational speed and to apply a second axial feed force to the FDS, wherein the second rotational speed is less than the first rotational speed and the second axial feed force is less than the first axial feed force wherein the one or more sensors send a signal to a controller, wherein the controller triggers the predetermined time delay in response to receiving the signal.

2. The method according to claim 1, wherein the predetermined first trigger condition includes the depth gradient.

3. The method according to claim 2, wherein the depth gradient is between 40 to 200 mm/s, inclusive.

4. The method according to claim 1, wherein the predetermined first trigger condition includes the depth.

5. The method according to claim 4, wherein a shank of the FDS includes a threaded portion, a thread forming portion adjacent the threaded portion, a cylindrical portion adjacent the thread forming portion, and a tip portion adjacent the cylindrical portion, the thread forming portion defining a partial-depth threadform that narrows in diameter with increased distance from the threaded portion, wherein the tip portion tapers from the cylindrical portion to an end of the shank, wherein the depth is a depth at which the cylindrical portion enters the substrate.

6. The method according to claim 1, wherein the predetermined second trigger condition includes the predetermined axial feed distance after detecting the predetermined first trigger condition.

7. The method according to claim 6, wherein the predetermined axial feed distance is 4 mm.

8. The method according to claim 6, wherein a shank of the FDS includes a threaded portion, a thread forming portion adjacent the threaded portion, a cylindrical portion adjacent the thread forming portion, and a tip portion adjacent the cylindrical portion, the thread forming portion defining a partial-depth threadform that narrows in diameter with increased distance from the threaded portion, wherein the tip portion tapers from the cylindrical portion to an end of the shank, wherein the predetermined axial feed distance corresponds to an axial feed distance at which the thread forming portion is at least partially within the substrate.

9. The method according to claim 6, wherein a shank of the FDS includes a threaded portion, a thread forming portion adjacent the threaded portion, a cylindrical portion adjacent the thread forming portion, and a tip portion adjacent the cylindrical portion, the thread forming portion defining a partial-depth threadform that narrows in diameter with increased distance from the threaded portion, wherein the tip portion tapers from the cylindrical portion to an end of the shank, wherein the predetermined axial feed distance corresponds to an axial feed distance at which the thread forming portion is at least partially within the substrate but the threaded portion is not yet within the substrate.

10. The method according to claim 1, wherein the predetermined second trigger condition includes the predetermined time delay after detecting the predetermined first trigger condition.

11. The method according to claim 10, wherein the predetermined time delay is 20 ms.

12. The method according to claim 1, wherein the substrate has a thickness of 5 mm or greater.

13. The method according to claim 1, further comprising positioning one or more additional substrates adjacent the substrate such that the FDS clamps the one or more additional substrates to the substrate after completion of the method.

14. The method according to claim 1, wherein the first rotational speed is between 3,000 to 12,000 RPM, inclusive, and the first axial feed force is between 0.5 to 4 kN, inclusive, wherein the second rotational speed is between 500 to 4,000 RPM, inclusive, and the second axial feed force is between 0.25 to 1.25 KN, inclusive.

15. A method of operating an automatic tool to install a flow drill screw (FDS) into a substrate, the method comprising:

engaging the FDS with the automatic tool;

operating the automatic tool at a first setting to drive the FDS into the substrate by causing flow of the substrate to permit the FDS to penetrate the substrate, the first setting being configured to rotate the FDS at a first rotational speed and to apply a first axial feed force on the FDS;

detecting a predetermined first trigger condition, the predetermined first trigger condition including a depth gradient;

detecting a predetermined second trigger condition using the one or more sensors, the predetermined second trigger condition detected in response to the predetermined first trigger condition being detected, the predetermined second trigger condition including at least one of a predetermined axial feed distance and a predetermined time delay; and switching the automatic tool from the first setting to a second setting in response to the predetermined second trigger condition being met, wherein the second setting is configured to rotate the FDS at a second rotational speed and to apply a second axial feed force to the FDS, wherein the second rotational speed is less than the first rotational speed and the second axial feed force is less than the first axial feed force, wherein the one or more sensors send a signal to a controller, wherein the controller triggers the predetermined time delay in response to receiving the signal.

16. The method according to claim 15, wherein the depth gradient is between 40 to 200 mm/s, inclusive.

17. The method according to claim 15, wherein the predetermined second trigger condition includes the predetermined axial feed distance after detecting the predetermined first trigger condition.

18. The method according to claim 17, wherein the predetermined axial feed distance is 4 mm.

19. The method according to claim 15, wherein the first rotational speed is between 6,000 to 10,000 RPM, inclusive, and the first axial feed force is between 0.5 to 3 kN, inclusive, wherein the second rotational speed is between 500 to 2,500 RPM, inclusive, and the second axial feed force is between 0.25 to 1.25 KN, inclusive.

* * * * *